(12) United States Patent
Xu et al.

(10) Patent No.: US 10,356,610 B2
(45) Date of Patent: Jul. 16, 2019

(54) METHODS, SYSTEMS AND DEVICES FOR SMALL CELL COMMUNICATIONS

(71) Applicant: Samsung Electronics Co., Ltd., Gyeonggi-do (KR)

(72) Inventors: Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 101 days.

(21) Appl. No.: 14/654,157

(22) PCT Filed: Dec. 11, 2013

(86) PCT No.: PCT/KR2013/011455
§ 371 (c)(1),
(2) Date: Jun. 19, 2015

(87) PCT Pub. No.: WO2014/098405
PCT Pub. Date: Jun. 26, 2014

(65) Prior Publication Data
US 2015/0334577 A1    Nov. 19, 2015

(30) Foreign Application Priority Data

Dec. 20, 2012 (CN) .......................... 2012 1 0560868

(51) Int. Cl.
*H04W 8/26* (2009.01)
*H04W 72/04* (2009.01)
(Continued)

(52) U.S. Cl.
CPC ............. *H04W 8/26* (2013.01); *H04W 16/32* (2013.01); *H04W 72/042* (2013.01); *H04W 72/0453* (2013.01); *H04W 84/045* (2013.01)

(58) Field of Classification Search
None
See application file for complete search history.

(56) References Cited

U.S. PATENT DOCUMENTS

| 2008/0188223 A1* | 8/2008 | Vesterinen ............ H04W 36/02 455/436 |
| 2008/0248804 A1* | 10/2008 | Al-Bakri ............... H04W 76/15 455/450 |

(Continued)

FOREIGN PATENT DOCUMENTS

CN             101682839 A        3/2010

OTHER PUBLICATIONS

International Search Report dated Mar. 26, 2014 in connection with International Patent Application No. PCT/KR2013/011455, 3 pages.

(Continued)

*Primary Examiner* — Adnan Baig

(57) ABSTRACT

The present invention presents a method for small cell communications, comprising: MME transmits a message of setting up a user plane for UE to a base station in a small cell cluster of the UE, wherein the messages of setting up a user plane include information about evolved radio access bearer as well as uplink tunnel identity and address of the transport layer assigned by SGW; the base station assigns downlink TEID and address of the transport layer to the UE, and responds to the MME; the MME transmits the downlink TEID and the address of the transport layer assigned to the UE to the SGW that serves the UE, and receives a response message from the SGW. Examples of the present invention further present an MME device, a base station device, an SGW device and a small cell communication system. The above scheme presented by the present invention provides a method of supporting the architecture and data transmission of small cells, which supports quick handover between small cells, reduces data loss during the handover, avoids multi-hop data forwarding, guarantees QoS, and improves user experience and system performance.

17 Claims, 10 Drawing Sheets

(51) Int. Cl.
*H04W 16/32* (2009.01)
*H04W 84/04* (2009.01)

(56) References Cited

U.S. PATENT DOCUMENTS

| | | |
|---|---|---|
| 2008/0259873 A1 | 10/2008 | Ahmavaara et al. |
| 2010/0113030 A1* | 5/2010 | Kanazawa ........... H04J 11/0093 455/437 |
| 2010/0238887 A1 | 9/2010 | Koodli et al. |
| 2011/0292896 A1* | 12/2011 | Yeuom .................. H04W 8/082 370/329 |
| 2012/0076047 A1 | 3/2012 | Turanyi et al. |
| 2012/0076120 A1 | 3/2012 | Kowali et al. |
| 2013/0244669 A1* | 9/2013 | Das ....................... H04W 24/02 455/446 |
| 2013/0272136 A1* | 10/2013 | Ali ........................ H04W 24/08 370/241 |

OTHER PUBLICATIONS

Written Opinion of International Searching Authority dated Mar. 26, 2014 in connection with International Patent Application No. PCT/KR2013/011455, 7 pages.

Cristina-Elena Vintila, "A Solution for Secure SIP Conferencing over IMS and SAE", WSEAS Transactions on Communications, Issue 7, vol. 9, Jul. 1, 2010, pp. 429-438.

State Intellectual Property Office of the People's Republic of China, Notification of First Office Action regarding Application No. 201210560868.8, dated Feb. 5, 2018, 18 pages.

\* cited by examiner

[Fig. 1]
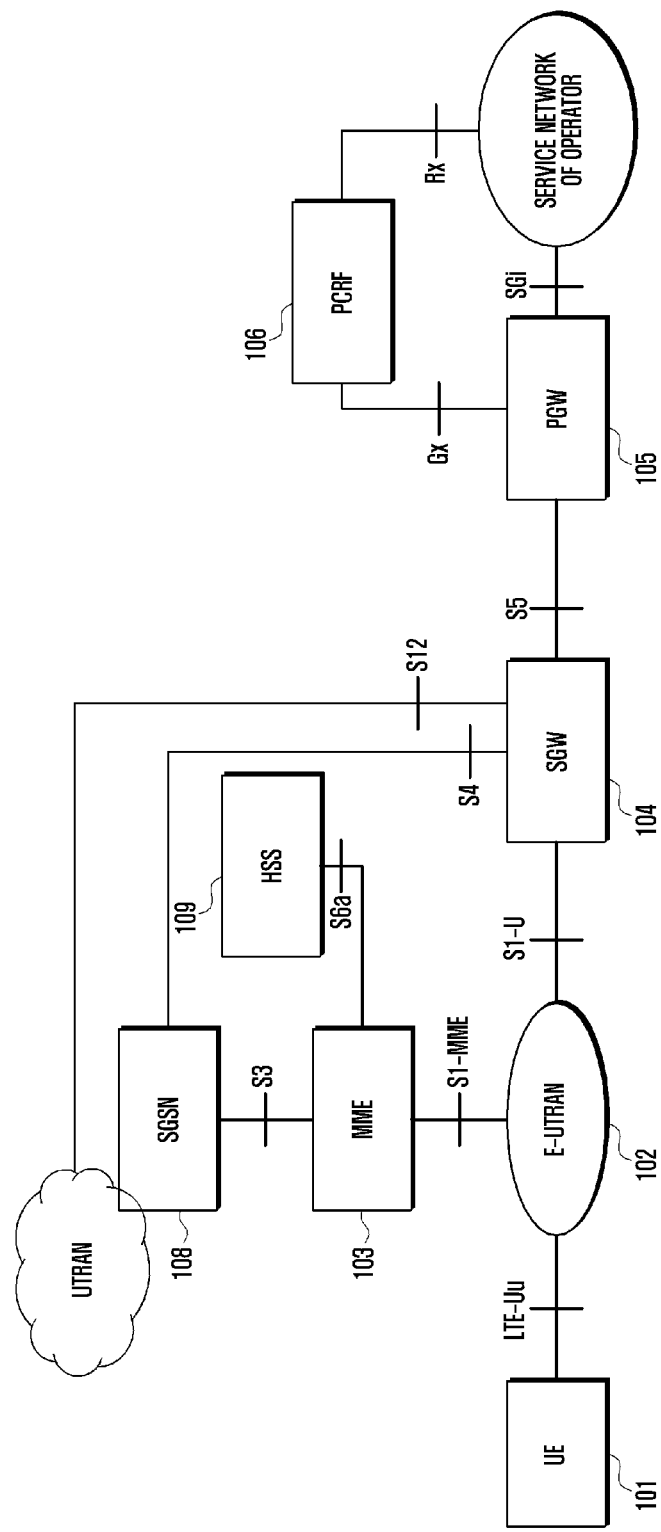

[Fig. 2]
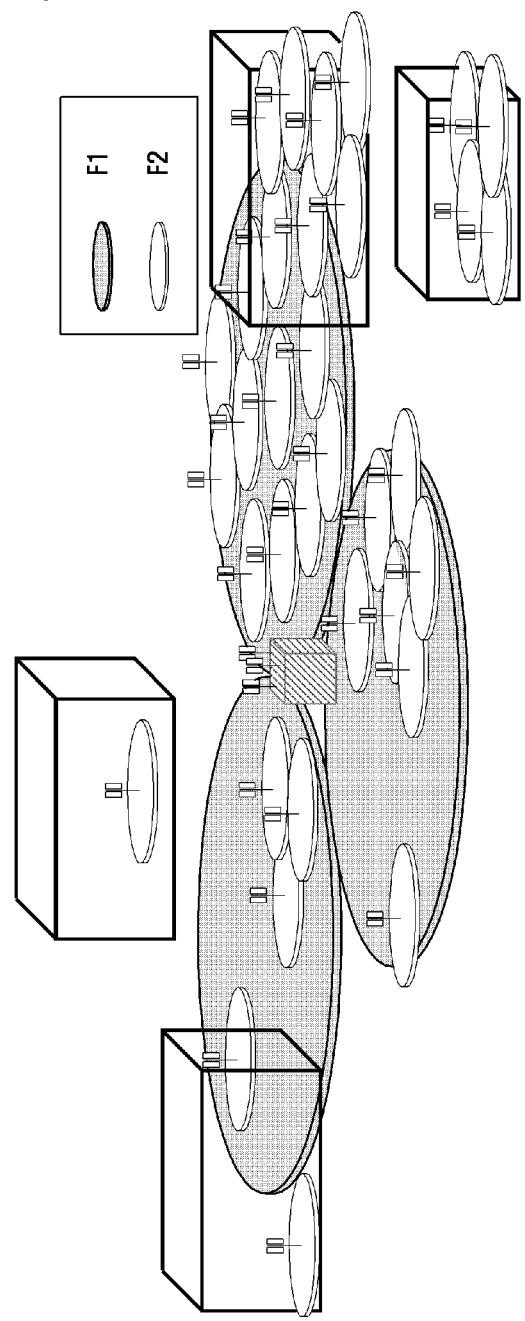

[Fig. 3]
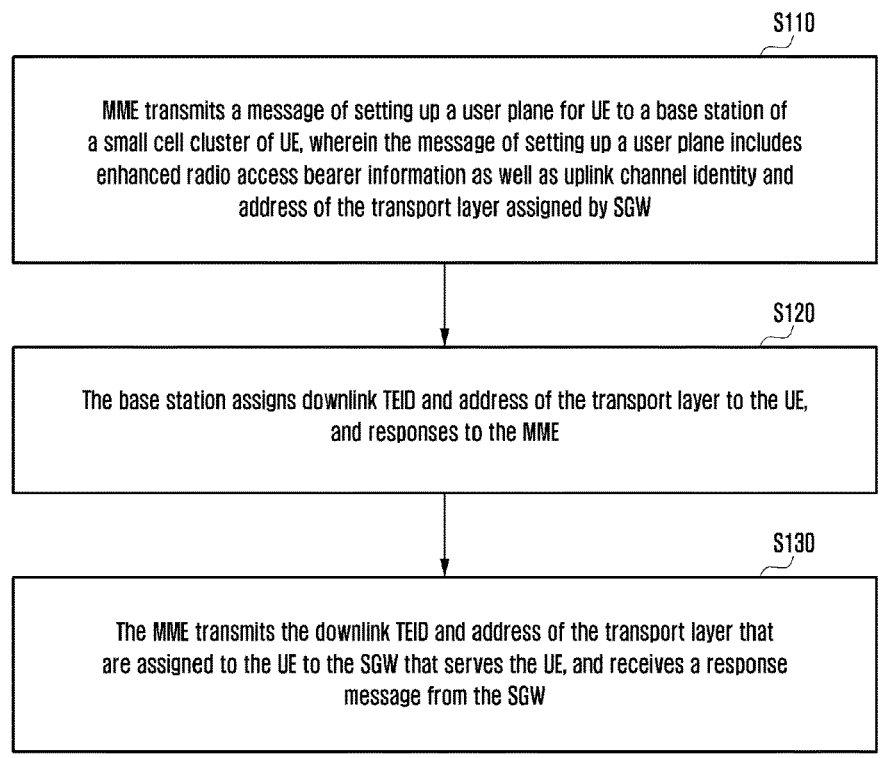
[Fig. 4]
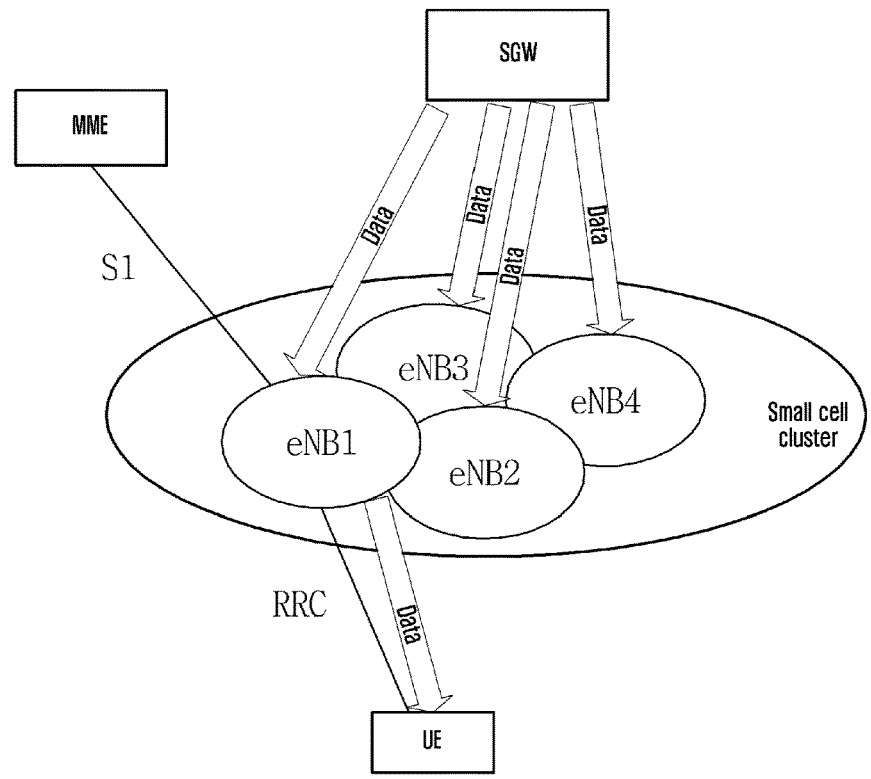

[Fig. 5a]
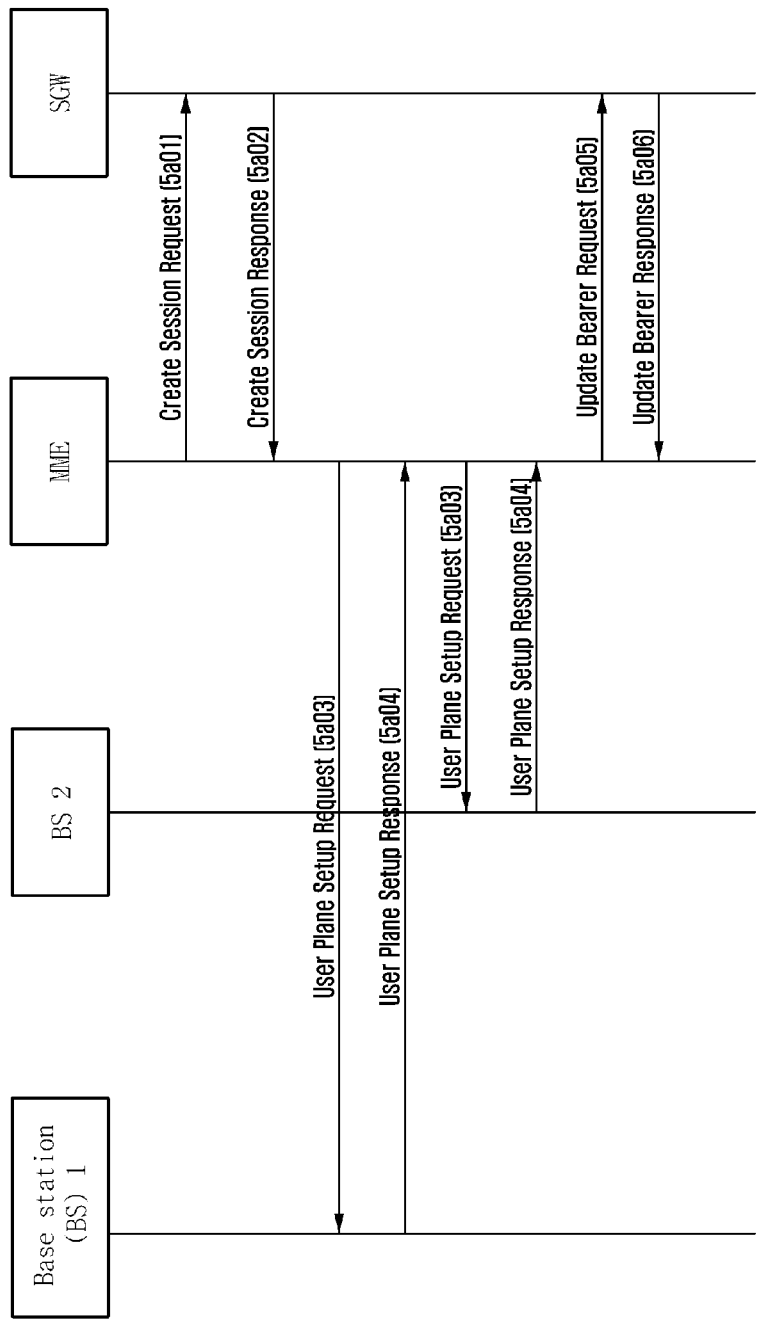

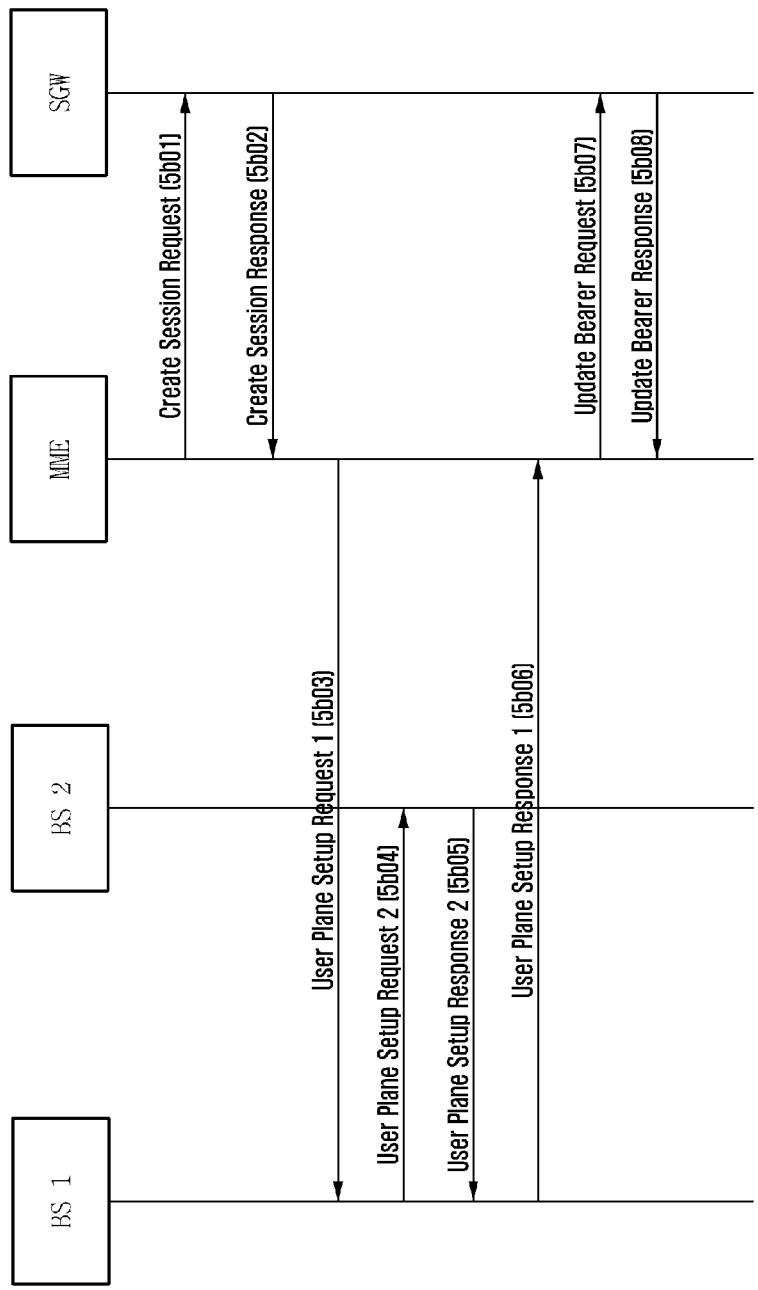
[Fig. 5b]

[Fig. 5c]
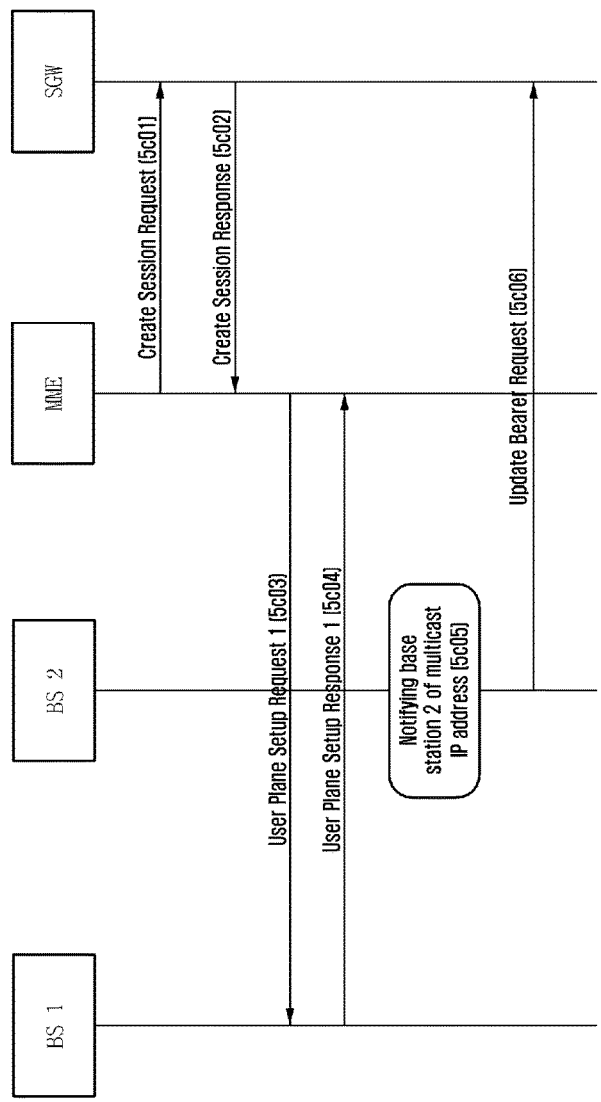
[Fig. 6]
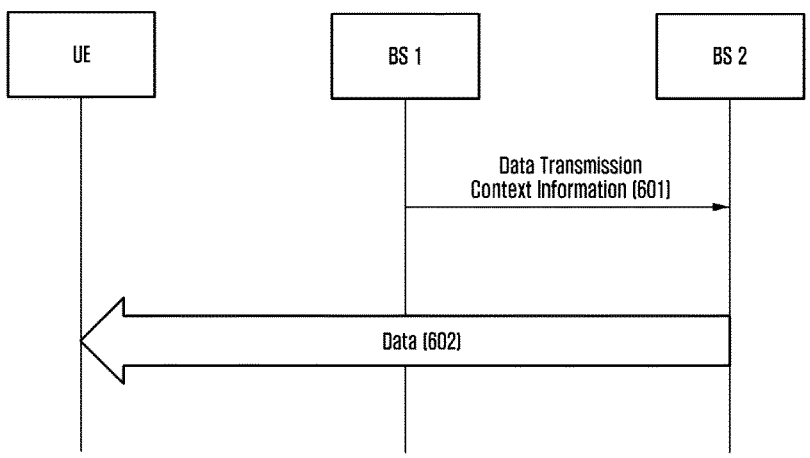

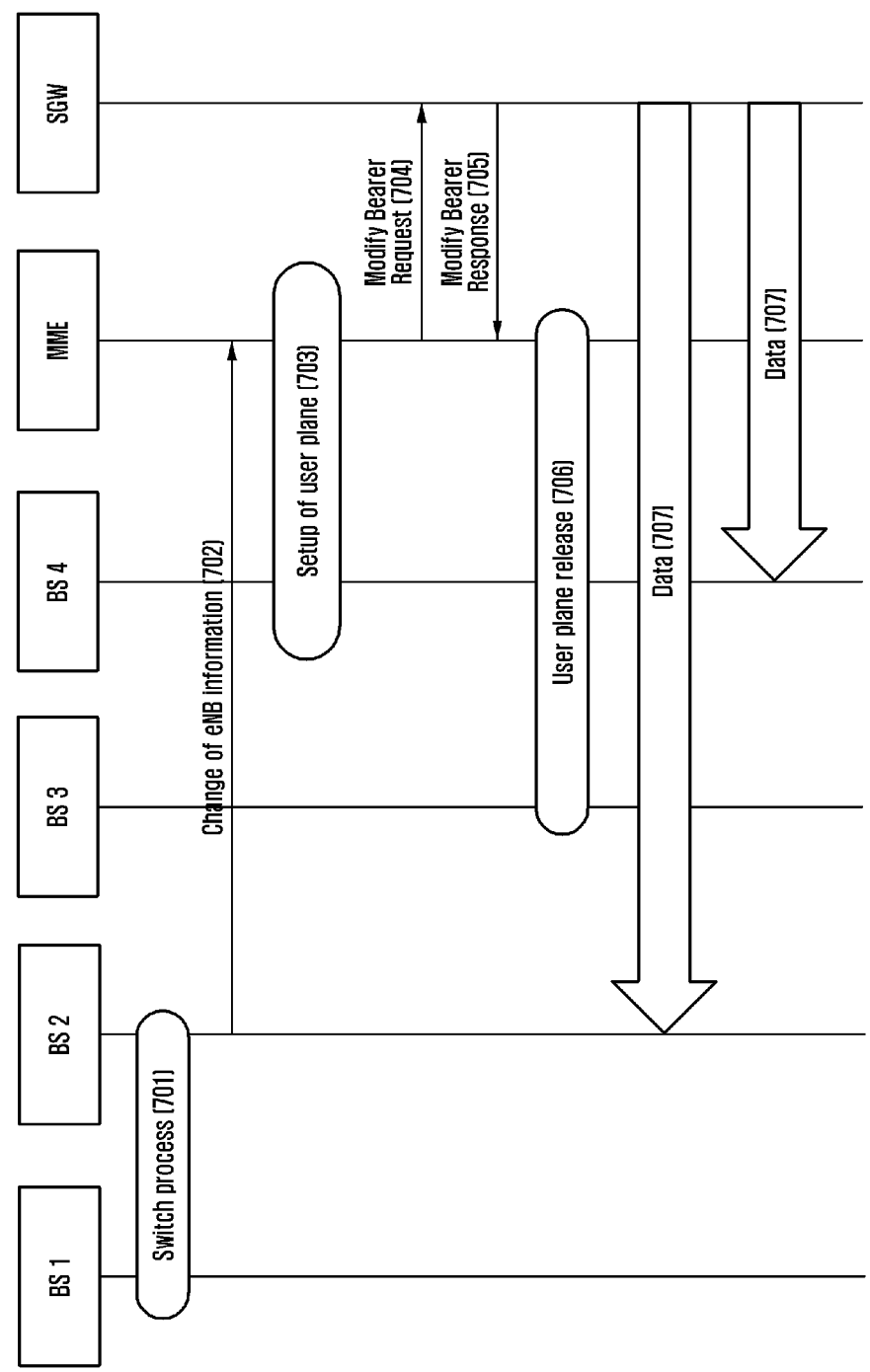
[Fig. 7]

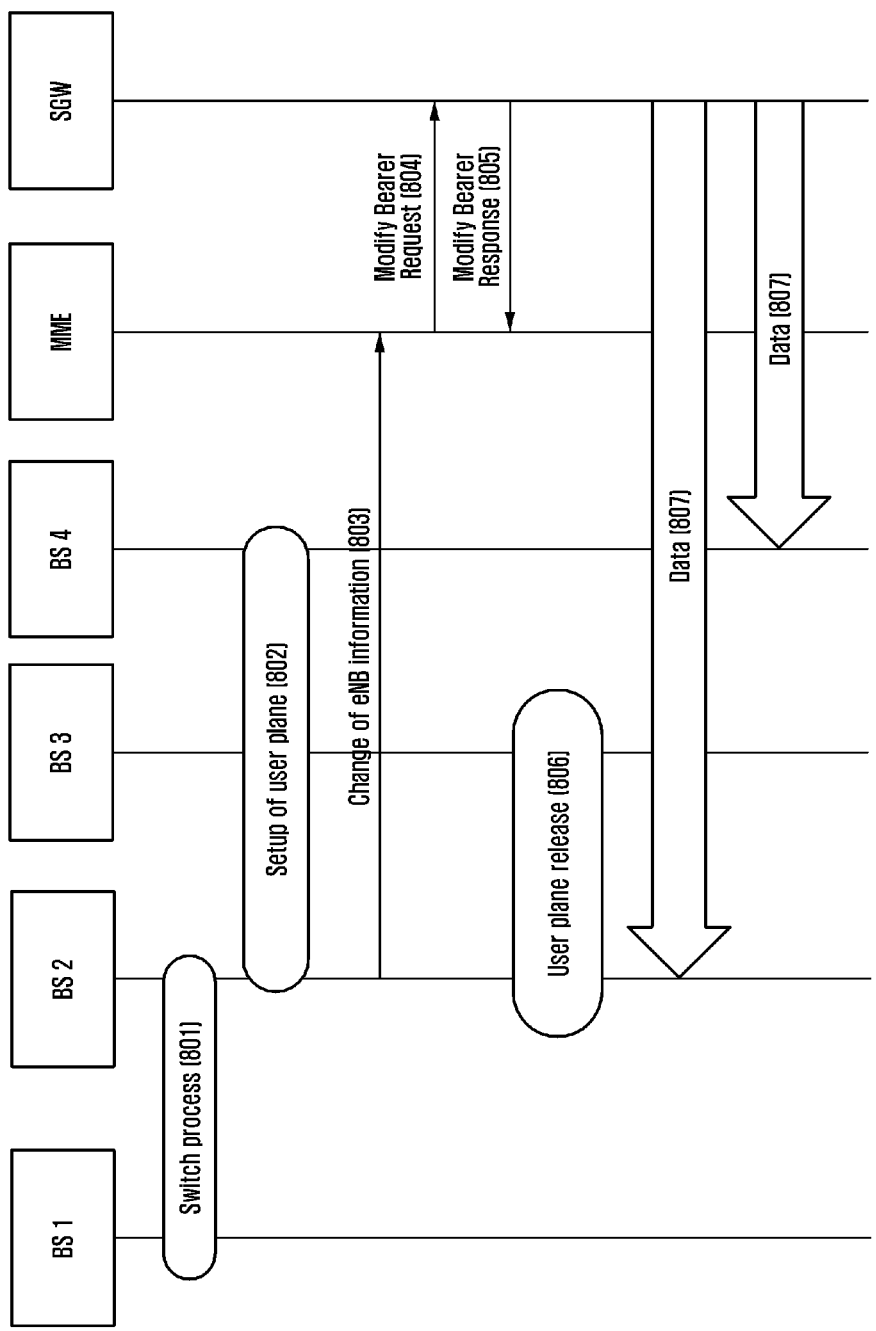

[Fig. 9]
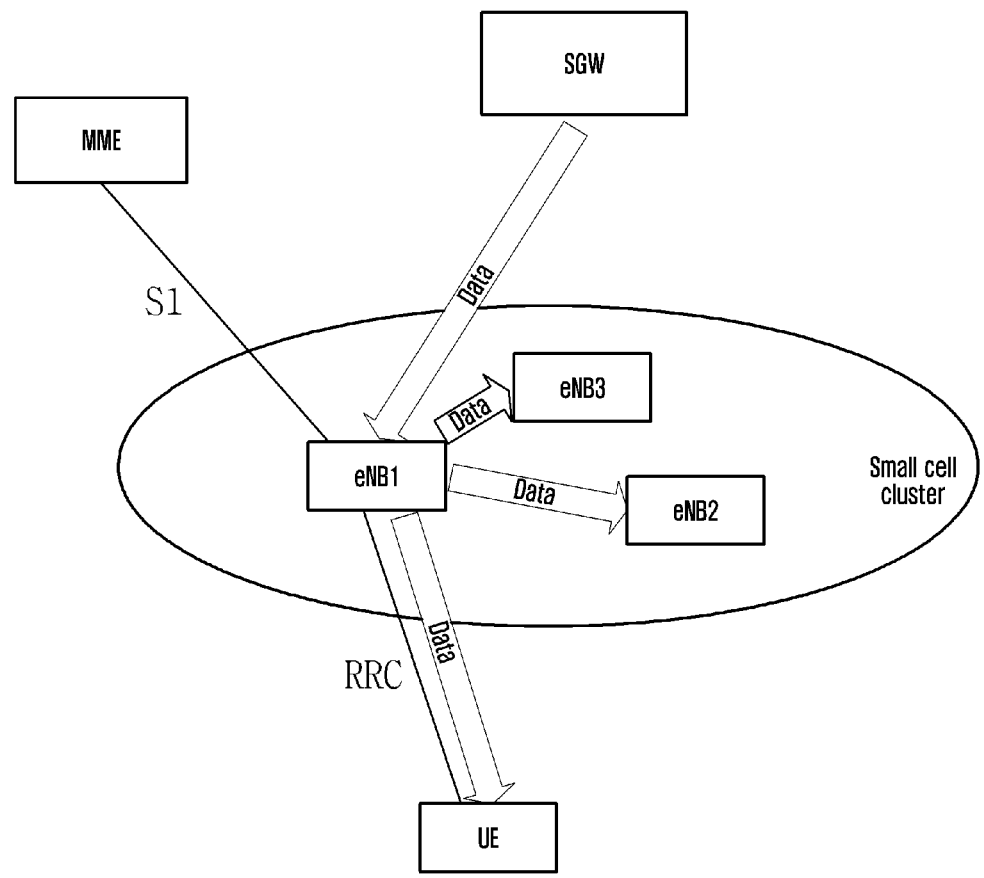

[Fig. 10]
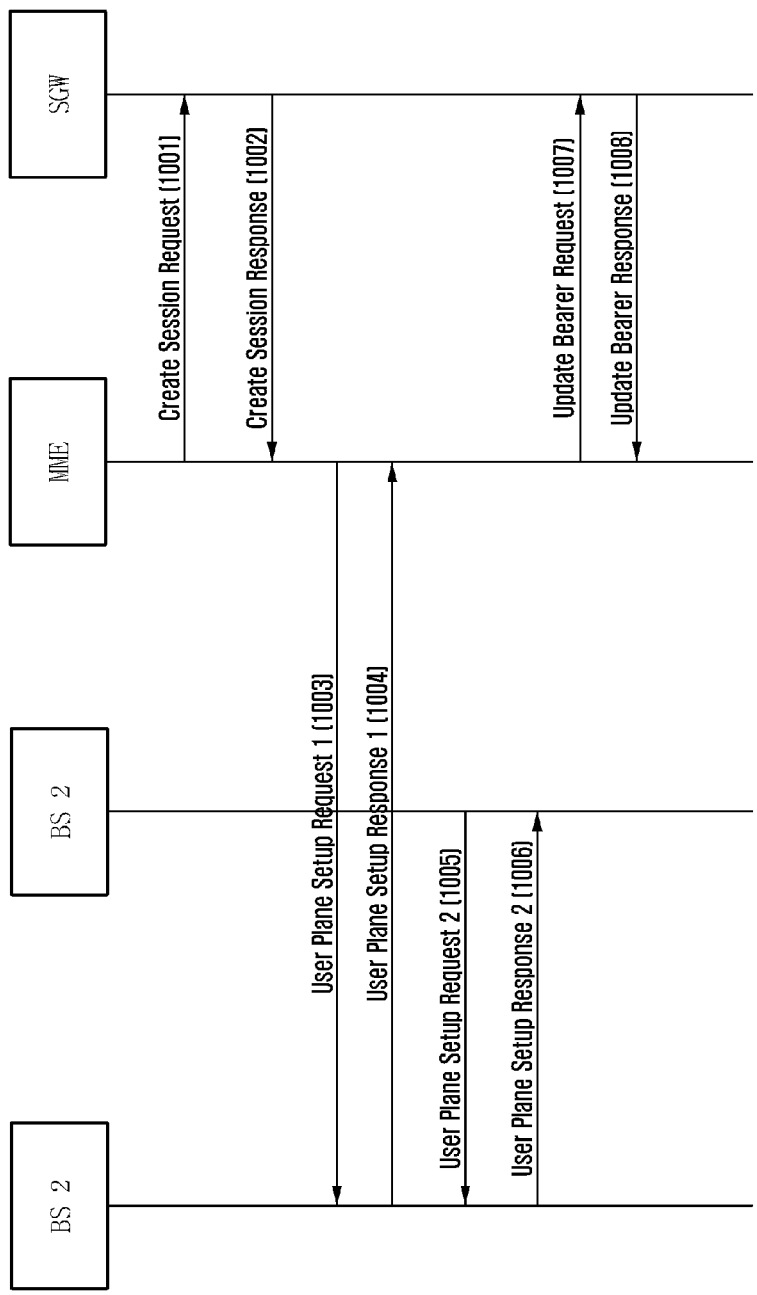

METHODS, SYSTEMS AND DEVICES FOR SMALL CELL COMMUNICATIONS

CROSS-REFERENCE TO RELATED APPLICATION

The present application claims priority under 35 U.S.C. § 365 to International Patent Application No. PCT/KR2013/011455 filed Dec. 11, 2013, entitled "METHODS, SYSTEMS AND DEVICES FOR SMALL CELL COMMUNICATIONS". International Patent Application No. PCT/KR2013/011455 claims priority under 35 U.S.C. § 365 and/or 35 U.S.C. § 119(a) to Chinese Patent Application No. 201210560868.8 filed Dec. 20, 2012, which are incorporated herein by reference into the present disclosure as if fully set forth herein.

TECHNICAL FIELD

The present invention relates to the technical field of mobile communications, to be specific, to methods, systems and devices of small cell communications.

BACKGROUND ART

Modern mobile communications tend to provide users with high-speed multimedia services. As shown by FIG. 1, it is a system architecture schematic diagram of System Architecture Evolution (SAE), wherein User Equipment (UE) 101 is a terminal device for receiving data. Evolved Universal Terrestrial Radio Access Network (E-UTRAN) 102 is a wireless access network, comprising macro base station (eNodeB/NodeB) that provides UE with wireless network interface. Mobile Management Entity (MME) 103 is in charge of mobile context, session context and security information of UE. Service Gateway (SGW) 104 mainly serves to provide a user plane, where MME 103 and SGW 104 may be in the same physical entity. Packet Data Network Gateway (PGW) 105 is in charge of duties such as billing, lawful interception, etc., which may also be in the same physical entity with SGW 104. Policy and Charging Rules Function (PCRF) 106 provides quality of service (QoS) policies and charging rules. Serving GPRS Support Node (SGSN) 108 is a network node equipment in the Universal Mobile Telecommunications System (UMTS) that provides routing for data transmission. Home Subscriber Server (HSS) 109 is the home subsystem of UE, which is in charge of user information including the current location of the user equipment, address of service node, security information about the user, package data context of the user equipment, etc.

3GPP proposes in Edition 12 (Rel-12) a requirement for small cell enhancement. Target scenarios for small cell enhancement include: a scenario under coverage of macro cells and scenarios without coverage of macro cells, indoor and outdoor, ideal and nonideal backhaul enhancement, as shown by FIG. 2.

In the condition under the coverage of macro cells, the application of the technique of carrier aggregation between base stations is put forward. Macro cells and small cells may operate in different frequency bands. However, technical solution of how to enhance performances of small cells are still absent in the condition not covered by macro cells.

DISCLOSURE OF INVENTION

Technical Problem

An object of the present invention is to at least overcome one of the above technical defects, in particular, to present a technical solution of enhancing performances of small cells in the condition not covered by macro cells. Apparently, the technical solution set forth by the present invention can likewise be applied to scenarios under the coverage of macro cells as well as other scenarios.

Solution to Problem

In one aspect, examples of the present invention provide a method for small cell communications, comprising the following steps:

MME transmits a message of setting up a user plane for the UE to a base station in a small cell cluster of UE, wherein the message of setting up a user plane include information about evolved radio access bearer as well as uplink tunnel identity and address of the transport layer assigned by SGW;

the base station assigns downlink TEID and address of the transport layer to the UE, and responds to the MME;

the MME transmits the downlink TEID and the address of the transport layer assigned to the UE to the SGW that serves the UE, and receives a response message from the SGW.

In another aspect, examples of the present invention also present an MME device comprising a receiving module and a transmitting module, the transmitting module being used for transmitting a message of setting up a user plane for UE to a base station in a small cell cluster of the UE, wherein the message of setting up a user plane includes: information about evolved radio access bearer as well as uplink tunnel identity and address of the transport layer assigned by SGW; and for transmitting downlink TEID and address of the transport layer assigned to the UE to the SGW that serves the UE;

the receiving module being used for receiving a response message from the base station, where the response messages includes: the downlink TEID and the address of the transport layer assigned to the UE by the base station; as well as for receiving a response message from the SGW.

In another aspect, examples of the present invention also present a base station device comprising a receiving module, a transmitting module and a resource management module, the receiving module being used for receiving a message of setting up a user plane for the UE transmitted from the MME, wherein the message of setting up a user plane includes information about evolved radio access bearer as well as uplink tunnel identity and address of the transport layer assigned by SGW;

the resource management module being used for assigning downlink TEID and address of the transport layer to the UE;

the transmitting module being used for responding to the MME.

In another aspect, examples of the present invention also present an SGW device comprising a receiving module, a transmitting module and a resource management module, the resource management module being used for assigning uplink user plane resources to UE;

the transmitting module being used for transmitting uplink user plane resources which are assigned to the UE to the MME;

the receiving module being used for receiving downlink TEID and address of the transport layer actually assigned to the UE transmitted from the MME.

In another aspect, examples of the present invention also presents a small cell communication system, comprising MME, base stations, SGW and UE, the MME being the MME device disclosed hereinabove for transmitting a message of setting up a user plane for the UE to the base station, wherein the message of setting up a user plane include: information about evolved radio access bearer as well as uplink tunnel identity and address of the transport layer assigned by the SGW, and for transmitting downlink TEID and address of the transport layer assigned to the UE to the SGW;

the base station being the base station device disclosed hereinabove, for assigning downlink TEID and address of the transport layer to the UE based on the received message from the MME, and responding to the MME, and for communicating with the UE;

the SGW being the SGW device disclosed hereinabove, for receiving downlink TEID and address of the transport layer which are actually assigned to the UE transmitted from the MME, and responding to the MME;

the UE being used for communicating with the base station in the small cell cluster.

Advantageous Effects of Invention

The above scheme presented by the present invention provides a method of supporting the architecture and data transmission of small cells, which supports quick handover between small cells, reduces data loss during the handover, avoids multi-hop data forwarding, guarantees QoS of services, and improves user experience and system performance. Moreover, the above scheme presented by the present invention only slightly changes the current system, thus exerts no influence on the compatibility of the system. In addition, it is simple and highly efficient.

The additional aspects and advantages of the present invention will be partially set forth in the following description, and they will become apparent through the following description, or can be learned through the practice of the present invention.

BRIEF DESCRIPTION OF DRAWINGS

The above and/or additional aspects and advantages of the present invention will become obvious and easy to understand in the description of examples below in combination with the drawings, wherein FIG. 1 is an architecture schematic diagram of the current SAE system;

FIG. 2 is a schematic diagram of deployment scenario of enhanced small cells;

FIG. 3 is a flow chart of setting up a user plane for UE by the present invention;

FIG. 4 is a schematic diagram of data transmission Architecture 1 of the present invention;

FIG. 5a is a schematic diagram of Method 1 for setting up a user plane for the UE of the present invention;

FIG. 5b is a schematic diagram of Method 2 for setting up a user plane for the UE of the present invention;

FIG. 5c is a schematic diagram of Method 3 for setting up a user plane for the UE of the present invention;

FIG. 6 is a schematic diagram of data transmission during the handover of the present invention;

FIG. 7 is a schematic diagram of Mode 1 for carrying out user plane update of the present invention;

FIG. 8 is a schematic diagram of Mode 2 for carrying out user plane update of the present invention;

FIG. 9 is a schematic diagram of data transmission Architecture 2 of the present invention;

FIG. 10 is a schematic diagram of setting up a user plane for the UE of the present invention under the Architecture 2.

MODE FOR THE INVENTION

Embodiments of the present invention will be described in details below, examples of the embodiments will be shown in the drawings, wherein same or similar symbols all along represent same or similar elements or elements having same or similar functions. Examples described below by reference to the drawings are exemplary, and only used for illustrating the present invention, rather than being construed as a limit on the present invention.

It can be understood by a person skilled in the art that unless otherwise specified, singular forms "a", "one", "said" and "the" used hereof also include plural forms. It should be further understood that the expression "comprise" used in the specification of the present invention refers to existence of said features, integers, steps, operations, elements an/or components, but does not rule out existence or addition of one or more other features, integers, steps, operations, elements, components and/or groups thereof. It should be understood that when an element is said to be "connected" or "coupled" to another element, it can be connected or coupled to the other element directly or in the presence of an intermediate element. Moreover, "connection" or "coupling" used hereof may include wireless connection or coupling. The expression "and/or" used hereof includes any unit or a combination of all of one or more related options.

It can be understood by a person skilled in the art that unless otherwise defined, all the terms used hereof (including technical terms and scientific terms) have same meanings as generally interpreted by an ordinary skilled person. It should also be understood that those terms as defined in general dictionaries should be interpreted as having connotations consistent to the context of prior arts, unless otherwise defined just like here, they won't be interpreted ideally or in an excessively formal way.

It can be understood by a person skilled in the art that the "terminal" and "terminal device" used hereof include both equipment of wireless signal receiver incapable of transmitting, and equipments of receiving and transmitting hardware capable of bidirectional communicating on a bidirectional communication link. This kind of equipments may include: cellular or other communication equipment with or without multi-line display; personal communication system (PCS) which is able to combine voice and data processing, facsimile and/or data communication; personal digital assistant (PDA) which may comprise a radio frequency receiver and a pager, internet/intranet access, a network browser, a notebook, a calendar and/or a global position system (GPS) receiver; and/or regular laptop and/or palm computers including a radio frequency receiver or other devices. The "terminal" and "terminal device" used hereof may be portable, transportable, mounted on vehicles (aviation, marine and/or land), or be suitable for and/or be configured to operate locally and/or operate in any other location on the earth and/or in the space in a distributed manner. The "terminal" and "terminal device" used hereof can also be a communication terminal, Internet terminal, a music/video playing terminal, for example, a PDA, an MID and/or a mobile phone with music/video players, or can be a device such as a smart TV, a set top box, etc. "base station" and "base station device" are network side devices corresponding to "terminal" and "terminal device".

To attain the object of the present invention, the present invention presents a method for small cell communications, comprising the following steps:

MME transmits a message of setting up a user plane for the UE to a base station in a small cell cluster of UE, wherein the message of setting up a user plane include information about evolved radio access bearer as well as uplink tunnel identity and address of the transport layer assigned by SGW;

the base station assigns downlink TEID and address of the transport layer to the UE, and responds to the MME;

the MME transmits the downlink TEID and the address of the transport layer assigned to the UE to the SGW that serves the UE, and receives a response message from the SGW.

As shown by FIG. 3, it is a flow charge of setting up a user plane for UE by the present invention, comprising steps S110 to S130.

S110: MME transmits a message of setting up a user plane for UE to a base station of a small cell cluster of UE, wherein the message of setting up a user plane includes information about evolved radio access bearer as well as uplink tunnel identity and address of the transport layer assigned by SGW.

To be specific, MME transmits a message of setting up a user plane to a base station in a small cell cluster in anyone of the following modes:

MME transmits a message of setting up a user plane for UE to each base station in a small cell cluster, which will be illustrated below in conjunction with FIG. 5a; or MME transmits a message of setting up a user plane for UE to a base station that the UE accesses to in the small cells, thereafter, the base station that the UE accesses to transmits a message of setting up a user plane for the UE to other base stations in the small cell cluster, which will be illustrated below in conjunction with FIG. 5b.

To be specific, UE data transmitted from the base station that the UE accesses to, to other base stations include:

PDCP Service Data Unit (SDU), PDCP Packet Data Unit (PDU) or GTP data packet.

Furthermore, it also include: MME requests SGW that serves the UE to assign uplink user plane resources and multicast IP addresses to the UE; correspondingly, a message of setting up a user plane for the UE also include: multicast IP addresses, which will be illustrated below in conjunction with FIG. 5c.

S120: the base station assigns downlink TEID and address of the transport layer to the UE, and responds to the MME;

S130: MME transmits the downlink TEID and the address of the transport layer assigned to the UE to the SGW that serves the UE, and receives a response message from the SGW.

To be specific, the SGW that serves the UE transmits data to base stations in the small cell cluster in anyone of the following modes:

SGW transmits UE data to each base station in the small cell cluster, which is recorded as Architecture 1 below, and illustrated in conjunction with FIG. 4; or SGW transmits UE data to a base station that the UE accesses to in the small cells, thereafter, the base station that the UE accesses to transmit UE data to other base stations in the small cell cluster, which is recorded as Architecture 2, and illustrated in conjunction with FIG. 9.

Moreover, when handover occurs for the UE, it further comprises:

the MME or the target base station (or new base station after handover) updates the user plane.

To be specific, updating a user plane for the UE by MME includes:

MME acquires information about the change of base stations in the small cell cluster from the target base station; MME transmits a message of setting up a user plane for the UE to the base station that belongs to the small cell cluster of the target base station but not in the small cell cluster of the source base station; MME transmits a message of modifying UE bearer to the SGW, which will be illustrated below in conjunction with FIG. 7.

To be specific, updating a user plane for the UE by the target base station includes:

the target base station transmits a message of setting up a user plane for UE to the base station that belongs to the small cell cluster of the target base station but not in the small cell cluster of the source base station, and transmits information about change of base stations in the small cell cluster to MME; MME transmits a message of modifying UE bearer to the SGW, which will be illustrated below in conjunction with FIG. 8.

As shown by FIG. 4, it is a schematic diagram of data transmission Architecture 1 of the present invention.

Base stations where several small cells reside form a small cell cluster. A small cell cluster may be a cluster of base stations where several small cells reside as configured by the network based on geographical area. Or according to the small cell the UE accesses to, a cluster can likewise be formed by base stations of several small cells around a base station of that small cell. When the UE accesses to the base station of the small cell cluster, core network node service gateway (SGW) transmits data to the base stations in the small cell cluster, for instance, eNB1, eNB2, eNB3 and eNB4.

In case of architecture 1, setting up a user plane for UE includes steps of:

UE accesses to base station 1 (such as base station 1 is a base station of a small cell, i.e. base station 1 is a base station in the cell cluster).

Base station 1 transmits information of other eNBs in the cluster to MME that serves the UE. Information of other eNBs may be identities of other eNBs or IP addresses or information that can identify the other base stations. Base station 1 can transmit information of other base stations in the cluster where base station resides, to the MME, when the speed of UE reaches a certain value. Or, base station 1 notifies the MME of information that UE is at a high speed when the speed of the UE reaches a certain value, and the MME obtains information of other base station in the cluster where base station 1 resides based on the configuration. Base station 1 can transmit UE high speed information or information of the cluster where base station 1 resides by means of a Initial UE message, or a path switch request message, or a handover request acknowledge message, or a handover notification message, or other S1 messages.

MME sets up a user plane of S1 interface for UE. Aside from conventionally setting up a user plane between SGW and base station 1 for the UE, MME also sets up a user plan for the UE between the SGW and other base stations in the cluster where base station 1 resides.

MME sets up user plane of S1 for the UE in modes including:

Mode 1 as shown in FIG. 5a;

Step 5a01, MME transmits a Create Session Request message to SGW that serves UE, to request the SGW to assign uplink user plane resource information to the UE.

Step 5a02, the SGW transmit a Create Session Response message to the MME. The Uplink User Plane information that transmitted to the MME includes uplink tunnel identity TEID and address of the transport layer.

If UE access to base station 1 through handover procedure, since the MME has acquired the uplink user plane information assigned by the SGW, Steps 5a01 and 5a02 can be omitted.

Step 5a03, MME respectively transmits a User Plane Setup Request message to base stations in a cluster where base station 1 resides, such message comprises information necessary for set up a user plane, for example, information containing enhanced radio access bearer (ERAB) as well as the uplink tunnel identity and address of the transport layer assigned by the SGW.

Messages transmitted from the MME to the base station that the UE accesses to (such as base station 1) can be different to messages transmitted to other base stations in the cluster. For example, messages that transmitted to the base station that the UE accesses to is Initial Context Setup Request, Path Request Acknowledge, or Handover Request messages. Messages that are transmitted to other base stations in the cluster are other User Plane Setup Request messages. Or, messages transmitted from the MME to the base station that the UE accesses to, are same messages that are transmitted to other base stations in the cluster. All the messages comprise information about ERAB required to be set up, such as ERAB identity, uplink TEID and address of the transport layer, and they further comprise information about quality of service QoS.

Or, to set up a user plane for UE between a base station that UE accesses to (such as base station 1) and SGW through a handover process or another process, MME only needs to transmit a User Plane Setup Request message to other base stations in the cluster.

Step 5a04, base stations in the cluster assign downlink TEID and address of the transport layer to ERAB, and transmit a User Plane Setup Response Message to MME. The User Plane Setup Response Message can be Initial Context Setup Acknowledge, Handover Request Acknowledge, or other S1 messages. Just as the request message, the response message transmitted from base station 1 can be different from those transmitted by other base stations in the cluster. Or, to set up a user plane for UE between a base station that UE accesses to (such as base station 1) and SGW through a handover process or another process, only a user plane between base stations, except for base station 1, in the cluster with SGW needs to be set up in the user plane setup process.

Step 5a05, MME transmits information about downlink TEID and address of the transport layer assigned by each base station to SGW that serves UE. MME transmits an Update Bearer Request message to SGW. SGW saves the information received.

Step 5a06, the SGW transmits an Update Bearer Response message to the MME.

Mode 2 is shown in FIG. 5b:

Steps 5b01 to 5b02 are same to Steps 5a01 to 5a02, details thereof are not given here.

If UE access to base station 1 through handover procedure, since MME has acquired the uplink user plane information assigned by SGW, Steps 5a01 and 5a02 are not necessary steps for the method.

Step 5b03, the MME transmits a message of User Plane Setup Request 1 to base station 1, the message comprising information necessary for setting up a user plane. The information includes enhanced radio access bearer information as well as uplink tunnel identity and address of the transport layer assigned by the SGW.

Step 5b04, base station 1 respectively transmits a message of a user plane setup request 2 to other base station in the Cluster, for example base station 2, to request other base stations to assign user plane information of S1 interface to the UE, and base station 1 notifies base station 2 uplink user plane information assigned by the SGW to the UE. The user plane information includes uplink TEID and address of the transport layer. Base station 2 assigns user plane resources of S1 interface to the UE. The user plane resources include downlink TEID and address of the transport layer assigned by base station 2. Base station 2 transmits downlink user plane resource information assigned to UE through Step 5b05 to base station 1.

Step 5b05, base station 2 transmits a User Plane Setup Response 2 message to base station 1. The message includes user plane information of S1 interface assigned by base station 2 to the UE, the user plane information including downlink TEID and address of the transport layer assigned to each ERAB.

Step 5b06, base station 1 transmits to MME, downlink TEID and address of the transport layer of each ERAB assigned by base stations in the cluster for the UE. Base station 1 transmits a User Plane Setup Response message to MME. The process of Step 5b03 and Step 5b06 can be an initial context setup process, a handover process or another process.

Steps 5b07 to 5b08 are same to Steps 5a05 to 5a062, details thereof are not given here.

Mode 3, a multicasting method is employed between SGW that serves the UE and base stations in the cluster for communications, as shown by FIG. 5c.

Step 5c01, MME transmits a Create Session Request message to SGW that is chosen to serve the UE, to request the SGW to assign uplink user plane resources to the UE. The MME can further request the SGW to allocate multicast IP address.

Step 5ca02, the SGW transmits a Create Session Response message to the MME. The uplink user plane information that transmitted by the SGW to the MME includes uplink tunnel identity TEID and address of the transport layer. The SGW transmits the allocated multicast IP address to the MME.

In the method of this invention, MME can directly assign multicast address for data transmission of the UE. Regarding this method, request for assigning IP multicast address won't be necessary in Step 5c01, and such multicast IP address is thus not required to be included in the message from Step 5c02. If the UE access to base station 1 through handover procedure, since the MME has acquired the uplink user plane information assigned by the SGW, steps 5c01 and 5c02 are unnecessary for the method.

Step 5c03, the MME transmits a User Plane Setup Request message to base station 1, the message comprising information necessary for setting up a user plane. The information includes enhanced radio access bearer information as well as uplink tunnel identity and address of the transport layer assigned by the SGW. The message further comprises multicast IP address.

The message may be an existing Initial Context Setup Request message, a Handover Request message, a Path Switch Request Acknowledge message or another S1 message.

Step 5c04, base station 1 transmits a User Plane Setup Response message to the MME.

In this method, it is an optional step. The message in such step can be an Initial Context Setup Response, a Handover Request Acknowledge, or another S1 message.

Step 5c05, other base stations in the cluster are notified of multicast IP address of S1 interface, take base station 2 as an example, there are two methods for notifying base station 2:

Method 1: MME transmits the multicast IP address to other base stations in the cluster. MME obtains information of other base stations in the cluster through configuration or Step 402.

Method 2: base station 1 transmits the multicast IP address to other base stations in the cluster.

Step 5c06, other base stations in the cluster join the multicast.

A user plane is set up between SGW that serves UE and base stations in the cluster through the above method. When the SGW receives downlink data, it transmits the data to each base station in the cluster.

Base station 1 transmits the downlink data to UE. Other base stations in the cluster discard the received data package after some delay. Whether delay exists and how long the delay will be are questions concerning implementation, this invention makes no restriction thereon. In practice, delay can be determined considering the transmission latency of air interface as well as time that UE needs for acknowledge.

When UE handover from base station 1 to base station 2 in the cluster, data is transmitted to the UE in a mode as shown in FIG. 6.

Step 601, base station 1 transmits Data Transmission Context Information to base station 2. In case of X2 handover, the information sent through X2 may be a current SN Status Transfer message or a new message. In case of S1 handover, the information sent through S1 interface may be a current eNB Status Transfer or another S1 message. The Data Transmission Context Information includes sequence number of a next package data control protocol PDCP which is neither acknowledged nor allocated, and/or sequence number of a GTP package required to be sent by the target base station. When radio link control (RLC) is in an acknowledged mode (AM), sequence number of a next unacknowledged PDCP can be transmitted. When RLC is in an unacknowledged mode UM, sequence number of a next unassigned PDCP can be transmitted. The message may further comprise hyper frame number (HFN) corresponding to sequence number of data packet, PDCP SN can be included in case in sequence and no redundant delivery need to be assured The Data Transmission Context Information may be transmitted from base station 1 to base station 2 after base station 1 sends an RRC reconfiguration message containing a Handover Command to the UE.

Step 602, after receiving a Handover Completion message from UE, base station 2 begins to transmit downlink data to UE. Base station 2 obtains a next data package that requires to be transmitted based on the Data Transmission Context Information, and begins to transmit the next unacknowledged or unsent data package to UE. Base station 2 obtains PDCP sequence number used by the next data package based on PDCN SN to be used next in the Data Context Information message, and ensures to send data in sequence.

In the method of the present invention, if MME decides to set up a user plan for UE to multiple base stations in the cluster, MME notifies a base station that serves UE (such as base station 1) information about setup of multiple S1 user planes, the notification may be in an explicit or an implicit way. An explicit notification is information about setup of multiple user planes for UE expressly notifying base station 1 by MME via S1 signaling. An implicit notification is information about setup of multiple user planes transmitted through base station 1 (such as base station 1) obtains the information through a process of setting up S1 user plane between SGW and another eNB in the cluster through base station 1. After base station 1 obtains that the user plane data is information transmitted from SGW to multiple base stations in the cluster, during the process that UE handover from base station 1 to base station 2 in the cluster, base station 1 does not request to forward the downlink data, but transmits the Data Transmission Context Information to base station 2.

The uplink data forwarding and the context information corresponding to the uplink data during the handover are same to the prior art, thus specifications thereof are omitted.

Base stations in the Cluster can be a group of fixed base stations configured by operators, or a group of small cell base stations around a service base station based on different service base stations that serve UE. A group of small cell base stations around the service base station can be configured by operators, or they are determined by the service base station based on one or more measurement reports from UE, or they are a group of small cell base stations around the service base station configured by operators, and are optimized and determined by the service base station based on measurement reports from UE.

During the process that UE handover from base station 1 to base station 2, information of base stations in the cluster may be changed. Mode 1 for carrying out update of a user plane is shown in FIG. 7.

Step 701, a process of handover from base station 1 to base station 2. For X2 handover, it may be a handover preparation or a handover execution. It may be either a handover preparation, or a handover preparation and a handover execution corresponding to S1 handover.

Another implementing method is that setting up a user plane between SGW and other base stations in the new cluster after the completion of X2 or S1 handover.

Step 702, base station 2 notifies MME of information about changed eNB information in the cluster. The information about changed eNB information can be information about new base stations, or information about a base station used to be in, but no longer in the cluster, and a base station used to be not in but is currently in the cluster. The base station information can be a base station identity, a base station IP, or other information for identification of a base station.

Base station 2 can notify MME of the above information through a Path Switch Request, a Handover Request Acknowledge, a Handover Notification or other S1 messages.

Step 703, MME triggers user plan setup procedure with new base station in the cluster. For example, in the process of setup of S1 user plane of base station 4, MME transmits uplink TEID and address of the transport layer assigned by SGW to base station 4, and notifies base station 4 with information necessary for setup of ERAB. Base station 4 transmits to the MME, downlink TEID and address of the transport layer assigned thereby.

Step 704, MME transmits a Modify Bearer Request message to SGW. The message contains downlink TEID and address of the transport layer assigned to each bearer by base stations in the cluster (such as base station 2 and base station 4). MME can notify SGW of downlink TEID and address of the transport layer assigned to each bearer by a group of downlink base station in the new cluster, or MME can notify SGW of changed information, for example, bearer information assigned by base stations requiring to be deleted, bearer information assigned by base stations requiring to be added. MME can notify SGW of downlink user plane resources assigned by a plurality of base stations through one message or several messages. SGW saves the new information.

Step 705, SGW transmits a Modify Bearer Response message to the MME.

Step 706, MME initiates a release process of S1 user plane resource of base stations which are not in the new cluster (such as base station 3 is in a cluster of a base station where UE resides before the handover, and is not in a cluster where base station 2 resides after the handover). The present invention makes no restriction on the time point of the release process.

Step 707, SGW transmits downlink data to base station 2 and base station 4. SGW no longer transmits data to base station 1 and base station 3.

Mode 2 for carrying out update of a user plane is shown in FIG. 8.

Step 801, a process of handover from base station 1 to base station 2. For X2 handover, it may be a handover preparation or a handover execution. It may be either a handover preparation, or a handover execution and a handover completion corresponding to S1 handover.

Another implementing method is that setting up a user plane between SGW and other base stations in a new cluster after the completion of X2 or S1 handover.

Step 802, base station 2 knows that base station aggregation in a cluster where base station 2 resides is different from that in the cluster where base station 1 resides. Base station 2 may know such information through configuration, or through X2 setup process in which base station 1 and base station 2 exchange base station information in their clusters, or through automatic configuration of neighboring regions (ANR) in which base station 2 knows base station information of a cluster where base station 1 resides. For example, base station 4 was not in the cluster of base station 1, but it is now in the cluster where base station 2 resides; base station 3 was in the cluster of base station 1, and it is now not in the cluster of base station 2; base station 2 notifies base station 4 of information about S1 user plane, including ERAB information as well as uplink TEID and address of the transport layer assigned by SGW. Base station 4 returns the downlink TEID and address of the transport layer assigned thereby to each ERAB back to base station 2.

Base station 2 obtains from ANR information about base stations in a cluster where base station 1 resides in a process: base station 1 cell broadcasts information about the cluster where it resides, the cluster information including the list of eNBs in the cluster where base station 1 resides. The eNB list information can be an eNB identity listing, an eNB IP address list, or other information for identification of eNBs. Information of the cluster may also be a cluster identity. UE reads broadcasting information of base station 1 cell while accessing to base station 2 cell, and transmits information of the cluster where base station 1 cell resides to base station 2. Base station 1 cell can acquire information of the cluster where base station 2 resides through a similar process.

Step 803, base station 2 notifies MME of information about changed eNB information in the cluster, wherein the information about changed eNB information can be information about a new base stations, or information about a base station used to be in, but no longer in the cluster, and a base station used to be not in but is currently in the cluster. The base station information can be information about S1 interface downlink user plane assigned by a group of new base stations.

Base station 2 can notify MME with the above information through a Path Switch Request, a Handover Request Acknowledge, a Handover Notification or other S1 messages.

Step 804, MME transmits a Modify Bearer Request message to SGW. The message contains downlink TEID and address of the transport layer assigned to each bearer by base stations in a new cluster (such as base station 2 and base station 4). MME can notify SGW of downlink TEID and address of the transport layer assigned to each bearer by a group of downlink base stations in the new cluster, or MME can notify SGW of changed information, for example, bearer information assigned by base stations requiring to be deleted, bearer information assigned by base stations requiring to be added. MME can notify SGW of downlink user plane resources assigned by a plurality of base stations through one message or several messages. SGW saves the new information.

Step 805, SGW transmits a Modify Bearer Response message to the MME.

Step 806, the base station initiates a release process of S1 user plane resources of a base station not in the new cluster (for example, base station 3 is in the cluster of a base station where UE resides before the handover, but is not in the cluster of base station 2 after the handover). The release process can be initiated by either base station 2 or base station 1. Base station 1 or base station 2 transmits a Release Request message to base station 3, the message containing identity of a bearer to be released. Base station 3 releases resources of a corresponding bearer at S1 interface.

Step 807, SGW transmits downlink data to base station 2 and base station 4. SGW no longer transmits data to base station 1 and base station 3.

FIG. 9 is a schematic diagram of data transmission Architecture 2 of the present invention.

Base stations where several small cells reside form a small cell cluster. A small cell cluster may be a cluster of base stations where several small cells reside as configured by the network based on geographical area. Or according to the small cell the UE accesses to, a cluster can likewise be formed by base stations of several small cells around a base station of that small cell. When UE accesses to the base station of the small cell cluster, the base station that UE accesses to transmit data to other base stations, for instance, eNB2 and eNB4, in the small cell cluster. When receiving downlink data, base station 1 transmits the downlink data to UE. Base station 1 transmits data to other base stations in the cluster. Data packages transmitted from base station 1 to other base station in the cluster can be: PDCP service data unit (SDU), or PDCP package data unit (PDU), or GTP data packages.

The received data package in other base stations in the cluster is discarded after some delay. Whether delay exists and how long the delay will be are questions concerning implementation, this invention makes no restriction thereon. In practice, the delay can be determined considering the transmission delay of air interface as well as time that UE needs for acknowledge.

In case of Architecture 2, the process of setting up a user plane for UE as shown by FIG. 10 includes steps:

Steps 1001 to 1002 are same to Steps 5a01 to 5a02, details thereof are not given here.

If the UE access to base station 1 through handover procedure, since the MME has obtained the uplink user plane information assigned by the SGW, steps 1001 and 1002 can be omitted.

Step 1003, MME transmits a message of User Plane Setup Request 1 to base station 1, the message comprising information necessary for setting up a user plane. The information includes enhanced radio access bearer information as well as uplink tunnel identity and address of the transport layer assigned by the SGW.

Step 1004, base station 1 transmits a User Plane Setup Response message to the MME. Base station 1 transmits to the MME, downlink TEID and address of the transport layer of each ERAB assigned thereby to the UE.

The process of Step 1003 and Step 1004 can be an initial context setup process, a handover process or another process.

If a user plane has been set up between base station 1 and SGW through the handover process, Steps 1003 and 1004 are not necessary.

Step 1005, base station 1 respectively transmits a User Plane Setup Request 2 message to other base stations in the Cluster (such as base station 2) to request them to set up a downlink data forwarding user plane of X2 interface for UE. Base station 2 assigns user plane resources of X2 interface to UE, and transmits information about user plane resource assigned to UE for downlink data forwarding to base station 1.

Wherein there is no absolute order for carrying out Step 1004 and Step 1005.

Step 1006, base station 2 transmits a User Plane Setup Response 2 message to base station 1. The message includes user plane information of X2 interface assigned by base station 2 to the UE, the user plane information including downlink data forwarding TEID and address of the transport layer assigned to each ERAB.

Step 1007, MME transmits an Update Bearer Request message to SGW.

There is no absolute order of Step 1007 and Step 1005.

Step 1008, SGW transmits an Update Bearer Response message to the MME.

In a case corresponding to the data transmission Architecture 2, Method 2 for setting up a data transmission user plane of X2 interface for UE, is:

Base station 1 informs MME of base station information of a cluster where base station 1 resides. The base station information can be a base station ID, a base station IP, or other information for identification of a base station. Or, MME obtains information about other eNB in the cluster where base station 1 resides through configuration.

MME requests other eNBs in the cluster where base state resides, for example base station 2, to allocate user plane resources for X2 interface data transmission. Base station 2 transmits TEID and address of the transport layer of the X2 interface for downlink data transmission to the MME.

MME informs base station 1 of user plane information of X2 interface assigned by base station 2 for downlink data transmission. The information contains an ERAB identity, TEID and address of the transport layer corresponding to each ERAB.

Through the above two methods, base station 1 can transmit downlink data received from SGW to base station 2.

When UE handover from base station 1 to base station 2, data is transmitted to the UE in a mode comprising the following steps:

base station 1 transmits Data Transmission Context Information to base station 2. In case of X2 handover, the information sent through X2 may be a current SN status transfer message or a new message. In case of S1 switch, the information sent through S1 interface may be a current eNB status transfer or another S1 message. Contents in Data Transmission Context Information vary with data packages sent from base station 1 to base station 2.

Case 1: base station 1 transmits PDCP SDU to base station 2.

During the handover, the Data Transmission Context Information transmitted from base station 1 to base station 2 contains a next unacknowledged or unassigned PDCP sequence number. It can be a next unacknowledged PDCP sequence number corresponding to RLC AM mode. It can be a next unassigned PDCP sequence number corresponding to RLC UM mode.

Case 1: base station 1 transmits PDCP PDU to base station 2.

During the handover, the Data Transmission Context Information transmitted from base station 1 to base station 2 contains a next unacknowledged PDCP sequence number or a next PDCP sequence number to be transmitted. It can be a next unacknowledged PDCP sequence number corresponding to RLC AM mode. It can be a next PDCP sequence number to be transmitted corresponding to RLC UM mode.

Case 2: base station 1 transmits GTP data package to base station 2.

During the handover, the Data Transmission Context Information transmitted from base station 1 to base station 2 includes sequence number of a next package data control protocol PDCP which is neither acknowledged nor allocated, and/or sequence number of a GTP package required to be sent by the target base station. When radio link control RLC is in an acknowledged mode AM, sequence number of the next unacknowledged PDCP can be transmitted. When RLC is in an unacknowledged mode UM, sequence number of the next unassigned PDCP can be transmitted. The message may further comprise hyper frame number (HFN) corresponding sequence number of data packet. PDCP SN can be included in case in sequence and no redundant delivery need to be assured The Data Transmission Context Information may be transmitted from base station 1 to base station 2 after base station 1 sends an RRC reconfiguration message containing a handover command to the UE.

After receiving a handover completion message from UE, base station 2 begins to transmit downlink data to UE. Base station 2 obtains a next data package that requires to be transmitted based on the Data Transmission Context Information, and begins to transmit the next unacknowledged or unsent data package to UE. Base station 2 obtains PDCP sequence number used by the next data package based on PDCN SN to be used next in the Data Transmission Context Information message, and ensures to send data in sequence.

When UE handover from base station 1 to base station 2, base station aggregation in the cluster where base station 1 resides may not be completely the same as that in the cluster where base station 2 resides. A data transmission user plane between base station 2 and other base stations in the cluster where base station 2 resides can be set up in the following modes:

Mode 1: same as steps 1005 and 1006, base station 2 initiates X2 user plane process to other base stations in the cluster where base station 2 resides, the X2 user plane is used for base station 2 to transmit downlink data to other base stations in the cluster. Base station 1 transmits a message to a base station in the cluster where base station 1 resides, requesting to release the user plane resource of X2 interface for data transmission.

Mode 2: same to Method 2 for setting up user plane for X2 interface data transmission for UE corresponding to the data transmission Architecture 2, MME sets up a user plane for X2 interface data transmission between base station 2 and other base stations in the cluster where base station 2 resides through S1 interface. Base station 1 transmits a message to a base station in the cluster where base station 1 resides, requesting to release the user plane resource of X2 interface for data transmission.

Mode 3, during the handover, base station 1 transmits to base station 2, TEID and address of the transport layer for X2 interface data transmission allocated for each ERAB by other base stations in the cluster. Same as Mode 1 or Mode 2, for a base station, for example base station 3, which used to be not in a cluster of base station 1 but in a cluster of base station 2, base station 2 sets up through X2 interface, or MME sets up through S1 interface, user plane resources for downlink data transmission between base station 2 and base station 3. For a base station, for example base station 4, which used to be in a cluster of base station 1, but not in a cluster where base station 2 resides, base station 2 initiates a release of X2 interface user plane resources assigned by base station 4. Or, base station 2 informs base station 1 of information about base station 4 not in a cluster of base station 2, and base station 1 requests base station 4 to release the initially assigned user plane resources of X2 interface for transmitting downlink data. Or, base station 1 immediately requests base station 4 to release the initially assigned user plane resources of X2 interface for transmitting downlink data.

If UE performs a handover between small cells, for example, handover from base station 1 to base station 2, then base station 2 transmit data received from SGW to other base stations, for example base station 3, in a cluster where base station 2 resides, without forwarding data received from base station 1 to base station 3, so as to assure of no repetitive data forwarding, because base station 1 also simultaneously transmits data to base station 3. In a case that a cluster changes with different serving base stations, another way for implementation is that for lossless ERAB as required by QoS, base station 2 can also transmits data package which is received from base station 1 and not yet sent to UE, to base station 3, so as to assure of no data loss.

This invention also sets forth corresponding equipment with respect to the above method.

Examples of the present invention also present an MME device 100 comprising a receiving module 110 and a transmitting module 120, wherein the transmitting module 120 is used for transmitting a message of setting up a user plane for UE to a base station of a small cell cluster of UE, wherein the messages of setting up a user plane include: evolved radio access bearer information as well as uplink tunnel identity and address of the transport layer assigned by SGW; and for transmitting downlink TEID and address of the transport layer assigned to UE to SGW that serves UE;

the receiving module 110 is used for receiving a response message from the base station, where the response message includes: downlink TEID and the address of the transport layer assigned to the UE by the base station; as well as for receiving response messages from the SGW.

As an example of MME device 100, transmitting module 120 being used for transmitting a message of setup of a user plane for UE to a base station in a small cell cluster of UE includes:

the transmitting module 120 transmits a message of setting up a user plane for UE to each base station of A small cell cluster; or the transmitting module 120 transmits a message of setting up a user plane for UE transmitted to a base station that the UE accesses to in small cells, thereafter, the base station that the UE accesses to transmits a message of setting up a user plane for UE to other base stations in the small cell cluster.

As an example of MME device 100, the transmitting module 120 is further used for requesting SGW that serves UE to assign user plane resources and multicast IP address to UE.

As an example of MME device 100, the receiving module 110 is further used for acquiring information about change of base station in the small cell cluster based on the target base station;

the transmitting module 120 is further used for transmitting a message of setting up a user plane for UE to a base station that lately joins the small cell cluster; as well as for transmitting a message of modifying UE bearer to the SGW.

Examples of the present invention also present a base station device 200 comprising a receiving module 210, a transmitting module 220 and a resource management module 230, wherein the receiving module is used for receiving a message of setting up a user plane for UE transmitted from the MME, wherein the message of setting up a user plane includes enhanced radio access bearer information as well as uplink tunnel identity and address of the transport layer assigned by SGW;

the resource management module 230 is used for assigning downlink TEID and address of the transport layer to the UE;

the transmitting module is used for responding to MME.

As an example of the base station device 200, the receiving module 210 is used for receiving a message of setting up a user plane for UE transmitted from the MME, it further comprises that the transmitting module 220 is used for transmitting a message of setting up a user plane for UE to other base stations in the small cell cluster.

As an example of the above base station device 200, receiving module 210 is also used for receiving UE data transmitted from SGW.

As an example of the base station device 200, when handover of UE occurs, the transmitting module 220 is further used for transmitting a message of setting up a user plane for UE to a base station that lately joins the small cell cluster, and for transmitting messages of change of base stations in the small cell cluster to MME.

Examples of the present invention also present an SGW device comprising a receiving module 310, a transmitting module 320 and a resource management module 330, wherein the resource management module 330 is used for assigning uplink user plane resources to UE;

the transmitting module 320 is used for transmitting uplink user plane resources which are assigned to UE to MME;

the receiving module 310 is used for receiving downlink TEID and address of the transport layer actually assigned to the UE transmitted from the MME.

As an example of the above SGW device 300, transmitting module 320 is further used for transmitting multicast IP address to MME.

As an example of the SGW device 300, the transmitting module 320 is further used for transmitting data to base stations of the small cell cluster in anyone of the following ways:

the transmitting module 320 is used for transmitting data of UE to each base station in the small cell cluster; or the transmitting module 320 is used for transmitting data of UE to a base station that UE accesses to in the small cells, thereafter, the base station that UE accesses to transmits the data of UE to other base stations in the small cell cluster.

As an example of the above SGW device 300, when the handover of the UE occurs, the receiving module 310 is further used for receiving message of modifying UE bearer transmitted from MME.

Examples of the present invention also present a small cell communications system, comprising an MME 100, a base station 200, an SGW 300 and a UE, To be specific, MME 100 is MME device 100 disclosed hereinabove for transmitting a message of setting up a user plane for UE to the base station 200, wherein the messages of setting up a user plane include: enhanced radio access bearer information as well as uplink tunnel identity and address of the transport layer assigned by the SGW 300, and for transmitting downlink TEID and address of the transport layer assigned to the UE to the SGW 300;

the base station 200 is the base station device 200 disclosed hereinabove, for assigning downlink TEID and address of the transport layer to the UE based on the messages received from the MME 100, and responding to the MME, and for communicating with the UE;

SGW 300 is the SGW device 300 disclosed hereinabove, for receiving downlink TEID and address of the transport layer which are actually assigned to the UE and transmitted from the MME 100, and responding to the MME 100;

the UE is used for communicating with the base station 200 in the small cell cluster.

The above method or device presented by the present invention provides a method of supporting the architecture and data transmission of small cells, which supports quick handover between small cells, reduces data loss during the handover procedure, avoids multi-hop data forwarding, guarantees QoS of services, and improves user experience and system performance. Moreover, the above scheme presented by the present invention only slightly changes the existing system, thus exerts no influence on the compatibility of the system. In addition, it is simple and highly efficient.

A person skilled in the art can understand that the present invention may involve devices for carrying out one or more the operations as described in the present application. The devices can be specially designed and manufactured as required, or can include well known equipment in a general-purpose computer which stores programs that are selectively activated or reconstructed. Computer programs as such can be stored in device (such as computer) readable media or in any type of medium suitable for storing electronic signaling and respectively coupled to a bus, the computer readable medium includes but not limited to any type of disk (including floppy disk, hard disk, optical disk, CD-ROM, and magneto optical disk), random access memory (RAM), read only memory (ROM), electrically programmable ROM, electrically erasable ROM (EEROM), electrically erasable programmable ROM (EEPROM), flash memory, magnetic card or optical line card. Readable media include any mechanism for storing or transmitting information in a device (for example, computer) readable form. For instance, readable media include random access memory (RAM), read only memory (ROM), magnetic disk storage medium, optical storage medium, flash memory apparatus, signals (such as carriers, infrared signals, digital signals) that travel in an electrical, optical, acoustic, or other form.

A person skilled in the art can understand that computer program commands can be used for implementing these structural diagrams and/or block diagrams and/or each block in flow charts as well as combinations thereof. These computer program commands can be provided to a general-purpose computer, a dedicated computer, or other processors with a programmable data processing method, to generate a machine, so that the commands can be executed by computers or other processors with a programmable data processing method to create dedicated methods for implementation of the structural diagrams and/or block diagrams and/or block or blocks in flow charts.

A person skilled in the art can understand that the operations, the methods, the steps in the flows, the measures, the schemes discussed in the invention can be replaced, changed, combined or deleted. Further, the operations, the methods, the other steps in the flows, the measures, the schemes discussed in the invention can also be replaced, changed, rearranged, combined or deleted. Further, prior arts having the operations, the methods, the other steps in the flows, the measures, the schemes discussed in the invention can also be replaced, changed, rearranged, combined or deleted.

The embodiments of this invention are only partially described above. It shall be indicated that for a person skilled in the art, improvements and modifications can still be made without deviating from the principle of this invention, and these improvements and modifications shall be deemed as protective scopes of this invention.

The invention claimed is:

1. A method by a mobility management entity (MME) implemented using small cell communications, the method comprising:

transmitting, to a service gateway (SGW) that serves a user equipment (UE), a create session request message;

receiving, in response to the create session request message from the SGW, uplink resources of a first user plane between the UE and a base station in a small cell cluster and a second user plane between the UE and other base stations in the small cell cluster, wherein the UE has accessed to the base station in the small cell cluster including small cells;

transmitting, to the base station, a first message to set up the first user plane, wherein the first message includes first information on the first user plane and second information on the second user plane, each of the first information and the second information being associated with an evolved radio access bearer, an uplink tunnel identity, and an address of a transport layer associated with the uplink resources assigned by the SGW;

receiving, from the base station, a downlink tunnel endpoint identifier (TEID) and address of the transport layer assigned by each of the base station and the other base stations in the small cell cluster;

transmitting the downlink TEID and the address of the transport layer assigned to the UE to the SGW; and receiving a response message from the SGW, wherein in response to receiving the first message to set up the first user plane at the base station, a second message including the second information to set up the second user plane is transmitted from the base station to the other base stations.

2. The method by the MME implemented using the small cell communications according to claim 1, wherein the received uplink resources in response to the create session request message from the SGW includes a multicast IP address assigned to the UE, wherein the first message further includes the multicast IP address.

3. The method by the MME implemented using the small cell communications according to claim 2, wherein one of the following applies:

data of the UE is transmitted from the SGW that serves the UE to each of the other base stations in the small cell cluster; or the data of the UE is transmitted from the base station to the other base stations in the small cell cluster.

4. The method by the MME implemented using the small cell communications according to claim 3, wherein the data of the UE is transmitted from the base station to the other base stations in the small cell cluster, comprises: transmitting packet data convergence protocol (PDCP) service data unit (SDU), PDCP packet data unit (PDU), or general packet radio service (GPRS) tunneling protocol (GTP) data packet.

5. The method by the MME implemented using the small cell communications according to claim 1, wherein, when a handover of the UE occurs, the first user plane and the second user plane for the UE are updated by the MME or a target base station.

6. The method by the MME implemented using the small cell communications according to claim 5, wherein updating the first user plane and the second user plane for the UE by the MME comprises:
   receiving information about a change of the other base stations in the small cell cluster from the target base station;
   transmitting a third message to set up a third user plane for the UE to a base station that belongs to the small cell cluster of the target base station; or
   transmitting, to the SGW, a message to modify a UE bearer.

7. The method by the MME implemented using the small cell communications according to claim 5, wherein if the first user plane and the second user plane for the UE are updated by the target base station,
   a message to set up a third user plane for the UE is transmitted from the target base station to the base station that belongs to the small cell cluster of the target base station;
   information about a change of a base station in the small cell cluster is transmitted from the target base station to the MME; and
   a message to modify a UE bearer is transmitted from the MME to the SGW.

8. A mobility management entity (MME) device comprising:
   a transceiver configured to transmit, to a service gateway (SGW) that serves a user equipment (UE), a create session request message, receive, in response to the create session request message from the SGW, uplink resources of a first user plane between the UE and a base station in a small cell cluster and a second user plane between the UE and other base stations in the small cell cluster, wherein the UE has accessed to the base station in the small cell cluster including small cells, transmit, to the base station, a first message to set up the first user plane, wherein the first message includes first information on the first user plane and second information on the second user plane, each of the first information and the second information being associated with an evolved radio access bearer, an uplink tunnel identity, and an address of a transport layer associated with the uplink resources assigned by the SGW; and
   a controller configured to control the transceiver to receive a response message from the base station, wherein the response message comprises a downlink tunnel endpoint identifier (TEID) and the address of the transport layer assigned to the UE by each of the base station and the other base stations in the small cell cluster, to transmit the downlink TEID and an address of the transport layer assigned to the UE to the SGW, and to receive a response messages from the SGW, wherein in response to receiving the first message to set up the first user plane at the base station, a second message including the second information to set up the second user plane is transmitted from the base station to the other base stations.

9. The MME device according to claim 8, wherein the received uplink resources in response to the create session request message from the SGW includes multicast IP addresses assigned to the UE.

10. The MME device according to claim 9, wherein the transceiver is configured to:
    receive information about a change of a base station in the small cell cluster from a target base station;
    transmit a third message to set a third user plane for the UE to a base station that belongs to the small cell cluster of the target base station; and
    transmit a message to the SGW to identify a UE bearer.

11. A base station comprising:
    a transceiver configured to receive a first message to set up a first user plane between a user equipment (UE) and the base station from a mobility management entity (MME), wherein the first message comprises first information on the first user plane and second information on a second user plane between the UE and other base stations in a small cell cluster, each of the first information and the second information being associated with an evolved radio access bearer, an uplink tunnel identity, and an address of a transport layer assigned by a service gateway (SGW), wherein the first information and the second information is determined based on uplink resources of the first user plane and the second user plane, transmitted from the SGW to the MME in response to a create session request message, assigned by the SGW, and wherein the create session request message is transmitted from the MME to the SGW; and
    a controller configured to control the transceiver to transmit a second message including the second information to set up the second user plane to the other base stations, to receive a downlink tunnel endpoint identifier (TEID) and address of the transport layer assigned to the UE by each of the other base stations, and to transmit a response message including a downlink TEID and an address of a transport layer assigned by each of the base station and the other base stations in the small cell cluster to the MME.

12. The base station according to claim 11, wherein the transceiver is further configured to receive, from the SGW, data of the UE.

13. The base station according to claim 12, wherein when handover of the UE occurs, the transceiver is configured to:
    transmit a third message to set up a third user plane for the UE to a base station that belongs to the small cell cluster of a target base station, and
    transmit, to the MME, a message of a change of a base station in the small cell cluster.

14. A service gateway (SGW) comprising:
    a transceiver configured to receive a create session request message from a mobility management entity (MME); and
    a controller configured to:
    assign an uplink resources of a first user plane and an uplink resource of a second user plane to a user equipment (UE), to
    control the transceiver to
    transmit the uplink resources of the first user plane and the second user plane that are assigned to the UE to the MME, the first user plane corresponding to a first base station in a small cell cluster including small cells and the second user plane corresponding to a second base station in the small cell cluster, and receive a downlink tunnel endpoint identifier (TEID) and an address of a transport layer assigned to the UE from MME, wherein the received TEID and the address of the transport layer is assigned by each of the first base station and the second base station in the small cell cluster.

15. The SGW according to claim 14, wherein the transceiver is configured to transmit a multicast IP address to the MME.

16. The SGW according to claim 15, wherein the transceiver is further configured to transmit data to the first base station and the second base station of the small cell cluster, and wherein one of the following applies:
   the data of the UE is transmitted to each of the first base station and the second base station in the small cell cluster; or
   the data of the UE is transmitted from the first base station that the UE has access to in the small cell cluster to the second base station in the small cell cluster.

17. The SGW according to claim 16, wherein the transceiver is configured to receive, from the MME, a message to modify a UE bearer, when a handover of the UE occurs.

* * * * *